United States Patent
Peter et al.

(10) Patent No.: US 8,625,780 B2
(45) Date of Patent: Jan. 7, 2014

(54) REDUCTION OF SIDE-CHANNEL INFORMATION BY INTERACTING CRYPTO BLOCKS

(75) Inventors: Steffen Peter, Frankfurt (DE); Michael Methfessel, Frankfurt (DE); Peter Langendorfer, Frankfurt (DE); Frank Vater, Cottbus (DE)

(73) Assignee: IHP GmbH—Innovations for High Performance, Microelectronics, Frankfurt (Oder) (DE)

( * ) Notice: Subject to any disclaimer, the term of this patent is extended or adjusted under 35 U.S.C. 154(b) by 550 days.

(21) Appl. No.: 12/449,333

(22) PCT Filed: Feb. 8, 2008

(86) PCT No.: PCT/EP2008/051560
§ 371 (c)(1), (2), (4) Date: Aug. 3, 2009

(87) PCT Pub. No.: WO2008/096004
PCT Pub. Date: Aug. 14, 2008

(65) Prior Publication Data
US 2010/0095133 A1   Apr. 15, 2010

(30) Foreign Application Priority Data
Feb. 9, 2007   (DE) .......................... 10 2007 007 699

(51) Int. Cl.
| H04K 1/00 | (2006.01) |
| H04L 9/00 | (2006.01) |
| H04L 9/28 | (2006.01) |
| H04L 9/30 | (2006.01) |
| G06F 11/30 | (2006.01) |
| G06F 12/14 | (2006.01) |

(52) U.S. Cl.
USPC ................. 380/28; 380/29; 380/30; 713/189

(58) Field of Classification Search
USPC ........................................................... 380/28
See application file for complete search history.

(56) References Cited

U.S. PATENT DOCUMENTS 4,316,055 A * 2/1982 Feistel ........................... 380/37
5,253,294 A * 10/1993 Maurer ........................ 380/264
(Continued)

FOREIGN PATENT DOCUMENTS

| DE | 100 61 997 A1 | 7/2002 |
| DE | 100 61 998 A1 | 7/2002 |
| GB | 2 306 722 A | 5/1997 |

OTHER PUBLICATIONS

Springer-Verlag Berlin Heidelberg, Julio Lopez and Ricardo Dahab, "Fast Multiplication on Elliptic Curves over GF (2m) without Precomputation", pp. 316-327, 1999.

*Primary Examiner* — Carolyn B Kosowski

(57) ABSTRACT

A cryptography device which reduces side channel information including a first computing block adapted to either encrypt or decrypt received first input data and to output the encrypted or decrypted first input data as first output data at a first data output, a second computing block adapted to either encrypt or decrypt received second input data and to output the encrypted or decrypted second input data as second output data at a second data output, and a control unit connected to the first and second computing blocks and adapted in a first operating condition on the one hand to partially or completely assign the first output data to the first computing block as the first input data and on the other hand to completely or partially assign the first output data to the second computing block as part of the second input data.

19 Claims, 4 Drawing Sheets

(56) References Cited

U.S. PATENT DOCUMENTS

| | | | |
|---|---|---|---|
| 5,982,895 A * | 11/1999 | Dworkin et al. | 380/271 |
| 6,088,802 A * | 7/2000 | Bialick et al. | 726/3 |
| 6,195,752 B1 * | 2/2001 | Pfab | 713/168 |
| 6,230,179 B1 * | 5/2001 | Dworkin et al. | 708/492 |
| 6,724,894 B1 | 4/2004 | Singer | 380/28 |
| 7,483,936 B2 * | 1/2009 | Janssen et al. | 708/513 |
| 7,496,616 B2 * | 2/2009 | Chari et al. | 708/250 |
| 7,787,620 B2 * | 8/2010 | Kocher et al. | 380/29 |
| 7,797,361 B2 * | 9/2010 | Lazich et al. | 708/251 |
| 2002/0169968 A1 | 11/2002 | Gammel et al. | 713/189 |
| 2004/0039928 A1 | 2/2004 | Elbe et al. | 713/189 |
| 2004/0105541 A1 | 6/2004 | Elbe et al. | 380/28 |
| 2007/0244950 A1 * | 10/2007 | Golic | 708/250 |
| 2007/0273408 A1 * | 11/2007 | Golic | 326/93 |

\* cited by examiner

REDUCTION OF SIDE-CHANNEL INFORMATION BY INTERACTING CRYPTO BLOCKS

CROSS REFERENCE TO RELATED APPLICATIONS

This application is for entry into the U.S. national phase under §371 for International Application No. PCT/EP2008/051560 having an international filing date of Feb. 8, 2008, and from which priority is claimed under all applicable sections of Title 35 of the United States Code including, but not limited to, Sections 120, 363 and 365(c), and which in turn claims priority under 35 USC §119 to German Patent Application No. 10 2007 007 699.3 filed on Feb. 9, 2007.

BACKGROUND OF THE INVENTION

1. Technical Field

The invention concerns a cryptography device, an integrated circuit with a cryptography device, a cryptographic method and a computer program product for carrying out the cryptographic method.

2. Discussion of Related Art

In cryptography the term side channel attack is used to denote any attack based on information gained from the physical implementation of a cryptosystem, so-called side channel information, which is therefore not based on theoretical weaknesses in the algorithms. For example timing information, power consumption, electromagnetic leaks or even sound can respectively provide an additional source of information which can be exploited to break the system. Many side channel attacks require considerable technical knowledge of the internal operations of a cryptosystem in which the cryptography method is implemented.

A distinction is drawn between different kinds of side channel attacks:

Timing attacks are attacks which are based on measuring the time that various computations of the cryptosystem require for implementation.

Architecture side effect attacks are attacks which utilize the side effects in the performance of a computation on a given machine architecture (for example erasing cache lines).

Power consumption measurement attacks are attacks which utilize the changing power consumption of the hardware during computations.

TEMPEST (van Eck or radiation monitoring) attacks are attacks which are based on the leakage of electromagnetic radiation and which provide direct plaintext or other information.

Acoustic cryptoanalysis attacks are attacks which exploit sound as the source of information which is emitted during the computations (similarly to the power consumption measurement attacks).

The underlying principle in all the above-specified cases is that physical effects which are produced while the cryptosystem is operating can provide useful extra information about secrets in the cryptosystem, for example a cryptographic key, in part status information, full or partial plaintext and so forth. The term cryptophthora (secret degradation) is sometimes used to express the degradation of the secret content of the secret key due to side channel leaks.

In a timing attack data movement into and out of the CPU or the memory of the hardware on which the cryptosystem or the algorithm is running is monitored. By observing how long it takes to transfer the key information, it is possible to determine how long the key is at that moment.

Internal computation steps in many cipher implementations provide information about the plaintext or the key. Some of that information can be inferred by the monitored timing. Alternatively, in a timing attack, it is also possible to monitor how long the cryptographic algorithm lasts. That alone can provide sufficient information to be useful in cryptoanalytical terms.

A power consumption attack can provide similar information by monitoring the power lines for the hardware, specifically the CPU. Just as with a timing attack, considerable information can be acquired under some circumstances in relation to some algorithms.

A fundamental and inevitable physical fact is that changes in the flow of current produce radio waves so that whatever is producing current flows—at least in principle—makes a van Eck (so-called TEMPEST) attack possible. If the current flows are structured to distinguishable degrees, which is usually the case, the radiation can be recorded in order to infer information about the operations on the corresponding hardware.

A further inevitable physical fact in circuits is that flowing currents heat the material through which they are flowing. Therefore depending on the respective current flow heat is also continuously dissipated to the environment. By virtue of the law of thermodynamics continually changing thermally induced mechanical stresses are produced in that way. Those stresses are the main causes of low level sound emissions from computing CPUs. It is conceivable that information about the computations of cryptosystems and algorithms can also be acquired in that way.

If the surface of the CPU chip or in some cases the casing of the CPU can be monitored, infrared images can also provide information about the operations which the CPU is performing. This is known as a thermal imaging attack.

A further form of side channel attacks is power analysis in which the attacker analyzes the current consumption of cryptographic hardware such as a smart card, a manipulation-secure black box, a microchip etc. The power analysis can provide information as to what a device is just doing and can even supply material of the key.

Differential power analysis is an expansion of power analysis, which can allow the attacker to compute intermediate values of data blocks and key blocks.

Viewing graphs of time and current which a cryptosystem consumes can often exactly show what the cryptosystem is doing at a given time.

The currents flowing through a cryptosystem are usually low. However electrical laboratories usually have devices for measuring them precisely enough, reliably and frequently. It is reasonable for a developer of a cryptosystem to assume that an adversary has access to such devices.

Power analysis does not look for weaknesses in the algorithms or protocols than rather in their implementations. It affords a possible way of "looking into" hardware which is otherwise manipulation-secure. For example a DES key processing plan includes 28 bit key registers rotating. To save time most embodiments simply check the least significant bit to see whether it is a 1. If that is the case it divides the register by two and attaches the 1 at the left-hand end. Power analysis can make clear the difference between a register with a 1 and a register with a 0, if that happens. That can expose information about the key used. DES permutations which are frequently simply implemented in software terms even offer still more information by virtue of decision branches.

Differential power analysis (DPA) is a method of attacking a cryptosystem in which the changing power consumption of microprocessors during the execution of cryptographic programs is utilized. It is also a side channel attack. By investigating a statistical analysis of the measured power consumption during many runs of a given cryptographic algorithm it may be possible to obtain information about the secret key stored on a smart card if the implementation of the algorithm is not DPA-manipulation-secure.

Another known countermeasure includes changes to the algorithm so that the cryptographic operations are applied to data which, with the instantaneous value, are in a mathematical relationship which survives the cryptographic operations. That is referred to as camouflaging and uses an algorithm based on number theory like factorizing or discrete logarithms.

U.S. Pat. No. 6,724,894 describes a method of protection from side channel attacks, specifically from differential power analysis, in which temporary keys are produced, by the secret key being modified with a random number. In a first step the message to be encrypted is encrypted with the temporary key. Thereafter a further function is applied to the message, which implements encryption, that encryption being identical to that which can be achieved directly with the unmodified key. That has the advantage that the information which is susceptible to side channel attacks varies continually with the random number and in that case the susceptibility of the cryptosystem to side channel attacks is reduced. It will be noted however that in this case it is necessary to produce a random number which as is known involves difficulties. Furthermore the complication and effort involved in encryption and decryption is greater if the random number becomes great. A further disadvantage is that the system is based on frequent changes in the temporary key because otherwise an attacker can calculate the secret key if the user does not change the key sufficiently frequently. Furthermore the same key is used at least during encryption of a message.

DE 100 61 997 A1 describes a cryptography processor with a central processing unit and a co-processor, wherein the co-processor includes a plurality of subcomputing devices arranged in parallel and a single control unit coupled to each of the plurality of subcomputing devices. In that case the control unit provides that an exclusive useful data computation is distributed to the individual subcomputing devices, in the form of suboperations which are to be performed in parallel and/or serial mode.

DE 100 61 998 A1 describes a cryptography processor having a plurality of co-processors, a central processing unit for control of the plurality of co-processors and a bus for connecting each co-processor to the central processing unit. In that case each co-processor has a control unit, a plurality of registers and an arithmetic unit. The cryptography processor is in the form of a multifunctional processor and can be used either for useful data computations or for dummy computations, but not at the same time for both kinds of computation.

The object of the invention is to provide a cryptography device and a method of encrypting or decrypting data, which each reduce the susceptibility to side channel attacks in a simple fashion.

DISCLOSURE OF INVENTION

In accordance with the invention there is proposed a cryptography device including
    a first computing block adapted to either encrypt or decrypt received first input data and to output the encrypted or decrypted first input data as first output data at a first data output,
    a second computing block adapted to either encrypt or decrypt received second input data and to output the encrypted or decrypted second input data as second output data at a second data output, and
    a control unit connected to the first and second computing blocks and adapted in a first operating condition on the one hand to partially or completely assign the first output data to the first computing block as the first input data and on the other hand to completely or partially assign the first output data to the second computing block as part of the second input data.

To prevent or at least considerably hinder information leakage of the cryptography device in accordance with the invention an artificial noise is introduced into the operation flow of the encryption algorithm. The noise is made available by the first computing block as first output data to be additionally processed in the second computing block.

The cryptography device is so designed that clever manipulation of the side channel information is effected. That results in a reduction in the side channel information. That has the advantage that an attacker who taps into side channel information would need so long to compute the secret key that the key can be classified as secure as long as it is used on a cryptography device according to the invention. In addition the data to be encrypted can also not be obtained by including side channel information.

In particular smart cards as are used for the decryption of encrypted TV programs can be unlimitedly analyzed by any possessor to extract the integrated key. In particular power analysis operations and DPA (differential power analysis) can be carried a plurality of times. In that case, as described above, the dynamic pattern of power consumption is analyzed. When using the cryptography device according to the invention in a smart card however key extraction is no longer possible as the side channel information no longer has a regular pattern.

Therefore in an embodiment there is proposed a smart card which includes a cryptography device according to the invention.

The expression computing block is used in the present application as being synonymous with the expressions cryptoblock or encryption and decryption block.

In an embodiment no data are passed to the first computing block from the exterior at the first data input in the first operating condition.

Cryptosystems are divided into symmetrical and asymmetrical cryptosystems. A symmetrical cryptosystem is a cryptosystem which in contrast to an asymmetrical cryptosystem uses the same key for encryption and decryption. The expression encryption method is therefore used in the present application in connection with symmetrical cryptosystems also as an abbreviation for encryption and decryption methods, for the sake of simplicity.

Therefore in a variant of the cryptography device the first or second computing block is adapted to compute the received first or second input data in accordance with a symmetrical encryption or decryption method.

Symmetrical cryptosystems have the advantage that the cryptography device can carry out an encryption method with a short key length.

Symmetrical encryption methods are divided into block ciphers and stream ciphers. A block cipher is an algorithm which encrypts a data block of typically 64 or 128 bits by means of a key value. In that case the encrypted block is of the same length.

Symmetrical encryption algorithms can be block encryption methods such as for example DES, AES (Advanced Encryption Standard), Triple-DES, IDEA (International Data Encryption Algorithm), Blowfish, Twofish, Anubis, A5/3

(KASUMI), Camellia, FEAL, Lucifer, Magenta, MARS, MISTY, SEED, Serpent, SHACAL, Skipjack, TEA, CAST-128, CAST-256, RC2, RC5 and RC6.

A stream cipher is symmetrical, continuous and delay-free encryption or decryption of a data stream. A stream cipher encrypts or decrypts messages bit-by-bit or character-by-character. Examples of stream ciphers are: A5/1, A5/2, Rabbit, RC4, SEAL or QUISCI.

The symmetrical encryption method used can be one of the aforementioned.

The common secret key must however be exchanged prior to the communication when a symmetrical encryption method is involved. That can entail serious difficulties. There are therefore the asymmetrical encryption algorithms.

An asymmetrical cryptomethod is a cryptomethod in which each of the communicating parties possesses a pair of keys comprising a secret part (private key) and a non-secret part (public key). The private key enables its holder for example to decrypt data, generate digital signatures or authenticate himself. The public key makes it possible for anyone to encrypt data for the key holder, to check the digital signatures thereof or to authenticate him. Accordingly a cryptography device which operates in accordance with an asymmetrical method involves two keys, depending on whether it encrypts or decrypts. In contrast to a symmetrical cryptosystem the communicating parties therefore do not have to know a common private key. That has the advantage that no exchange of a private key is necessary. Therefore in a variant of the cryptography device the first or the second computing block is adapted to compute the received first or second input data in accordance with an asymmetrical encryption or decryption method. The suitable asymmetrical encryption algorithms include RSA, Rabin and Elgamal cryptosystems. In recent years encryption with elliptic curves (Elliptic Curve Cryptography, ECC) has become more and more popular as, with the same level of security, it manages with substantially smaller keys.

Asymmetrical encryption methods are more computation-intensive than symmetrical encryption methods. Therefore the area of application of symmetrical and asymmetrical encryption methods is different. In this connection a combination of the two encryption methods can be useful. In an embodiment of the cryptography device therefore the first computing block is adapted to compute the received first input data in accordance with a symmetrical encryption or decryption method and the second computing block is adapted to compute the received second input data in accordance with an asymmetrical encryption or decryption method. Thus for example a private key of a symmetrical method can be encrypted and transmitted by means of an asymmetrical encryption method. Then larger amounts of data can be transmitted encrypted in accordance with the symmetrical method.

In an embodiment of the cryptography device the first computing block is adapted to compute the received first input data in accordance with an AES encryption or decryption method and the second computing block is adapted to compute the received second input data in accordance with an ECC encryption or decryption method.

In an embodiment the asymmetrically operating encryption and decryption block includes a key change unit. That is adapted to make a public key available in the encryption operation and to make a private key available in the decryption operation.

The computing block can also include a key storage device. In that way the cryptography device can encrypt to different addressees. The keys can also be a fixed constituent part of the computing block so that they cannot be changed.

In an embodiment of the cryptography device the control unit is adapted to assign to at least one computing block useful data and additionally pseudo-random data as first and second input data respectively, which are not required for actual encryption or decryption respectively. Those pseudo-random data are also referred to as dummy data.

The term useful data is used to denote those data which the message actually to be encrypted or decrypted contains. In the example of decryption of a TV program useful data are the encrypted image data of the program. The useful data are obtained from a useful data source. In the example of the TV program the useful data source is a broadcast or cable receiver. The dummy data are more or less random additional data which make no contribution to actual encryption or decryption and which after passing through a computing block are sorted out and discarded. They only serve to interfere with the side channel information by virtue of additional computing operations or a modified operation flow. In this embodiment the control unit can pass the dummy data to the data input of the first or the second computing block. In an embodiment of the cryptography device the dummy data are formed by a part of the first output data or by the first output data overall. In this embodiment the first output data are preferably not passed to a device output of the cryptography device. In this embodiment therefore dummy data assigned to the second computing block in the first operating condition are preferably the first output data. Dummy data assigned to the first computing block in the first operating condition are in this embodiment preferably also the first output data.

In an alternative embodiment which is not preferred here the dummy data can be produced by a separate dummy data source which is therefore different from the first and second computing blocks, or by the control unit.

The first computing block can couple its output data back to its data input and in that case use an AES encryption algorithm and run for example in the CFB or CBC mode. A part of the output data of the first computing block can be passed by the control unit to the data input of the second computing block, which additionally processes those data. In that case the second computing block can use an ECC encryption algorithm. In that respect the encrypted output data of the first computing block are not outputted from the cryptography device but encrypted again in order then to be encrypted afresh, and so forth. If those encrypted data are tapped off after each round the result obtained is a pseudo-random data stream. That pseudo-random data stream or also random data stream is used to produce a randomness in the ECC execution in the second computing block. The randomness provides that no conclusions about the keys used or the processed data can be drawn from the time and power consumption of the ECC-computing block. In an embodiment of the cryptography device the control unit is adapted to stop and start operation of the first or second computing block independently of each other.

The control unit can thus switch the computing blocks on and off independently of each other, for example when a computing block is not being used. On the other hand the control unit can interfere with the side channel information by irregularly stopping and starting one or both computing blocks.

Multiplication operations are highly computation-intensive in digital systems. A large number of multiplication steps are performed in the case of encryption algorithms.

In an embodiment of the cryptography device therefore the second computing block is adapted to perform polynomial multiplications required in encryption or decryption by means of a Karatsuba method. Multiplication in accordance with the Karatsuba algorithm has the advantage that it requires fewer computing operations than a conventional multiplication operation. The use thereof can also lead to an increase in speed because its transit time complexity is lower.

In a further embodiment of the cryptography device at least one computing block has a plurality of parallel multiplication units. Multiplication units are modules which can perform a multiplication operation in one or more clock cycles of a digital system like the cryptography device. The use of parallel multiplication units produces an increase in speed in multiplication operations. In contrast to serial processing a large number of multiplication operations can be performed at the same time.

A combination of a multiplication operation in accordance with Karatsuba and the use of a plurality of parallel multiplication units is also advantageous as, in multiplication in accordance with Karatsuba, the numbers to be multiplied are broken down into smaller parts. Those parts can then be simultaneously computed with parallel multiplication units.

In an embodiment the control device is adapted to distribute an m-bit multiplication iteratively for example to 9 partial multiplications of the bit length m/4. For that purpose 9 clock cycles are then required. In that case a computing block is adapted to perform the multiplication operations of the length m/4 in a respective clock cycle, by 9 parallel multiplication units of the size m/16 (m/4/4) being instantiated in the computing block. The operations of the multiplication units are then performed in parallel relationship. If m/4/4 is greater than 8 bits the control unit can further break down the partial multiplication operations.

In an embodiment the number m=256. This requires 9 clock cycles, in which a respective multiplication operation of the length of 64 bits is performed. The control unit is adapted to break down the 64 bit multiplication into 9 blocks of the size 16 bits and each of those 9 16-bit blocks again into 9 partial multiplication operations of the length of 4 bits. The parallel multiplication units can be combined to afford 64-bit blocks. Each 64-bit block has internally for example 81 4-bit multiplication units which can be addressed in parallel relationship.

In an embodiment of the cryptography device the control unit is adapted to predetermine for the first or second computing block a number of computing operations which are to be carried out in parallel relationship per clock unit in each case either from one clock unit to another clock unit or at greater time intervals. The number of computing operations to be carried out in parallel relationship, per clock unit, can be predetermined by the control unit for example by a control signal. The first computing block or the second computing block or both computing blocks are in this embodiment preferably adapted to extract control information contained in a control signal received from the control unit and to adjust the number of computing operations to be carried out in parallel relationship in the respective computing block, per clock unit, in dependence on the extracted control information.

The control signal can include the control information about the number of computing operations to be carried out in parallel relationship, per clock unit, in the form of pseudorandom data. For that purpose the control information can be obtained for example by extracting data out of the stream of the first output data. In an embodiment the extracted first output data are additionally subjected to a conversion computation operation to form the control information from the receiving computing block.

In different embodiments, depending on the respective quantitative requirement in terms of control information, all first output data or only parts of the first output data can be used as control information.

This property of the cryptography device permits very delicate manipulation of the side channel information because no multiplication operation can now be assumed to be interference-free as the number of manipulation operations carried in parallel relationship and thus also the power consumption and the time consumption for each multiplication operation continually changes. In the event of non-use of all parallel multiplication units the total computing time for encryption or decryption is admittedly prolonged, but power consumption is not increased because no additional multiplication operations have to be performed.

Power analysis can most easily distinguish decision branchings when executing the cryptographic program because the cryptosystem performs various operations, in which case different amounts of power are consumed, depending on which decision branch is executed. For that reason it is desirable if from the point of view of power consumption, there are no differences in decision branchings in the case of cryptographic implementations. Rotations, permutations and logical operations (such as for example XOR) should as far as possible last for the same length of time and consume a similar amount of power.

There are however some algorithms with inherently meaningful and informative branchings. In a variant therefore two useful data sources can also output two different useful data streams. In that case each computing block is adapted to process a respective useful data stream.

In this variant of the cryptography device the first computing block is connected to a first device input for first useful data and a device output and the second computing block is connected to a second device input for second useful data and the same device output. In this case the control unit is adapted in a second operating condition to pass both the first output data to the device output and not to the second computing block and not to the first computing block and also return the second output data outputted by the second computing block back to the device output.

The advantage of this variant is that the first computing block also processes useful data. In that way two different input data or input data streams can be encrypted or decrypted at the same time. For example, as already described hereinbefore, the first computing block can implement symmetrical encryption or decryption and the second computing block can implement asymmetrical encryption or decryption with different input data.

A further advantage is that the dynamics of the overall power consumption of the cryptography device in that operating condition involve the superimpositioning of the dynamics of the power consumption of the two computing blocks operating in parallel relationship. Accordingly it is not possible for each computing block to be analyzed individually from the exterior. It is thus more difficult to infer the operations, in particular the decision branchings, in a computing block, on the basis of the side channel information. That means that the secret internal key is protected.

The device output can also be divided so that each computing block has its own dedicated device output. In the case of only one device output the output data of the computing blocks can be multiplexed onto the device output.

In a further embodiment of the cryptography device the control unit is adapted to change between the first and the second operating conditions.

In this embodiment the control unit can determine the operating condition in which the cryptography device is to run. In the first operating condition the output data of the first computing block are coupled back onto its data input and proportionately fed to the second computing block as additional input data. In the second operating condition the computing blocks operate simultaneously on various input data, or only one computing block operates.

In an embodiment of the cryptography device the control unit is adapted to predetermine for the first or second computing block one of various predeterminable successions of computing operations.

The advantage of altering the sequence of computing operations is a further reduction in the side channel information delivered. Cryptoanalysis is based on the assumption of regularity in the analyzed algorithm. That regularity is lost by interchanging successions of computing operations. If an attacker does not know which operations are carried out in succession because the sequence of the computing operations continually changes, that can make it difficult to infer the internal system state and the position in the algorithm. Accordingly the secret key and the secret data are protected from cryptoanalysis.

In a further embodiment of the cryptography device the control unit is adapted to predetermine the succession of the computing operations in the second computing block. The succession of computing operations can be predetermined by the control unit for example by a control signal. In this embodiment the second computing block is preferably adapted to extract the succession control information contained in a control signal received from the control unit and to adjust the succession of computing operations to be carried out in dependence on the extracted succession control information.

The control signal can contain the succession control information relating to the succession of computing operations to be carried out in the form of pseudo-random data, that is to say dummy data. That has the advantage that the randomness of the succession of computing operations can be increased. For that purpose the succession control information can be obtained for example by extracting data from the stream of the first output data. In an embodiment the output data extracted are additionally subjected to a conversion computation operation for forming the succession control information by the receiving second computing block.

In different embodiments depending on the respective quantitative requirement of control information, all first output data or only parts of the first output data can be used as succession control information. In an embodiment of the cryptography device the first or the second computing block includes a multiplicity of multiplication units. The control unit is adapted to pass useful data in parallel relationship to a first subset of the multiplication units and dummy data to a second subset of the multiplication units.

That has the advantage that dummy data and useful data can be processed in each multiplication operation. That means that the side channel information is disturbed, for each multiplication operation. An attacker can thus ascertain less information about a secret key or processed data if exclusively useful data are processed in no multiplication operation. The control unit can also pass useful data to a first subset of the multiplication units, dummy data to a second subset and no data to a third subset.

In an embodiment the cryptography device can be in the first operating condition and the first output data can be used as dummy data. In that case the control unit at least partially assigns the first output data to the second computing block.

The first output data represent pseudo-random data and are highly suitable as dummy data. They are assigned to the second computing block in the first operating condition and not outputted at a device output. The dummy data can be used to carry out additional computing operations with the dummy data in the second computing block or to predetermine the number of computing operations to be carried out in parallel relationship. In an embodiment dummy data can be passed to a proportion of parallel multiplication units and useful data can be passed to another proportion. In an embodiment it is possible to control the succession of the computing operations with the dummy data. Accordingly the first output data are control data for the second computing block. In that case the second computing block can have an additional data input to which the dummy data are assigned to control the succession of the computing operations in the second computing block. In all cases the side channel information of the cryptosystem is disturbed and thereby reduced.

In a further embodiment the control unit is adapted to feed a first data stream to the first computing block from the exterior and a second data stream to the second computing block from the exterior. The control unit is further adapted to pass the first output data at least partially to the second computing block and not to pass same to the device output. The first output data can be used as dummy data.

In an embodiment the control unit can comprise a plurality of separate parts which can in part also be integrated into the computing blocks.

In a variant of the cryptography device the first and second computing blocks and the control unit are respectively hardware-implemented. In a further variant an integrated circuit includes the cryptography device. Integrated circuits are a usual form of hardware implementation. They can be produced inexpensively in large numbers. In a further embodiment an ASIC includes the cryptography device.

The use of hard-wired hardware for the cryptography device has the advantage that the power consumption fluctuates less in operation. That is the case in particular if the cryptography device includes a multiplicity of parallel multiplication units. That reduces the signal-noise ratio of the side channel information. That provides for a reduction in the side channel information.

It is noted that a combination of the various embodiments of the cryptography device, that are described in this application, is also possible, insofar as the embodiments by way of example are not described expressly as alternatives to each other.

The underlying technical object of the invention is attained in accordance with a further aspect of the invention by a control module for a cryptography device.

Hereinafter in accordance with a second aspect of the invention there is proposed a method of encrypting or decrypting data.

The method includes encrypting or decrypting first input data with a first computing block and outputting the encrypted or decrypted first input data as first output data at a first data output. In addition the method includes encrypting or decrypting second input data with a second computing block and outputting the encrypted or decrypted second input data as second output data at a second data output. The method further includes assigning the first output data on the one hand either partially or completely as input data to the first computing block and on the other hand assigning same either partially or completely as part of the second input data to the second computing block.

In the method presented the first output data are therefore partially or completely fed back to the first data input.

The advantages of the method according to the invention are apparent from the above-described advantages of the cryptography device in accordance with the first aspect of the invention. Embodiments by way of example of the method are described hereinafter.

In an embodiment of the method assigning of the first output data to the second computing block includes a control in respect of the succession of the computing operations in the second computing block on the basis of the first output data.

In a further embodiment of the method assigning of the first output data to the second computing block includes a control in respect of the number of computing operations to be carried out in parallel relationship in the second computing block on the basis of the first output data.

The method can be carried out with the cryptography device in accordance with the first aspect of the invention. In that case the proportion of side channel information is reduced, whereby for example a secret key used or other secret data are protected from cryptoanalytical attacks.

BRIEF DESCRIPTION OF THE DRAWINGS

Further embodiments by way of example are described hereinafter with reference to the Figures.

DETAILED DESCRIPTION

Figure 1:
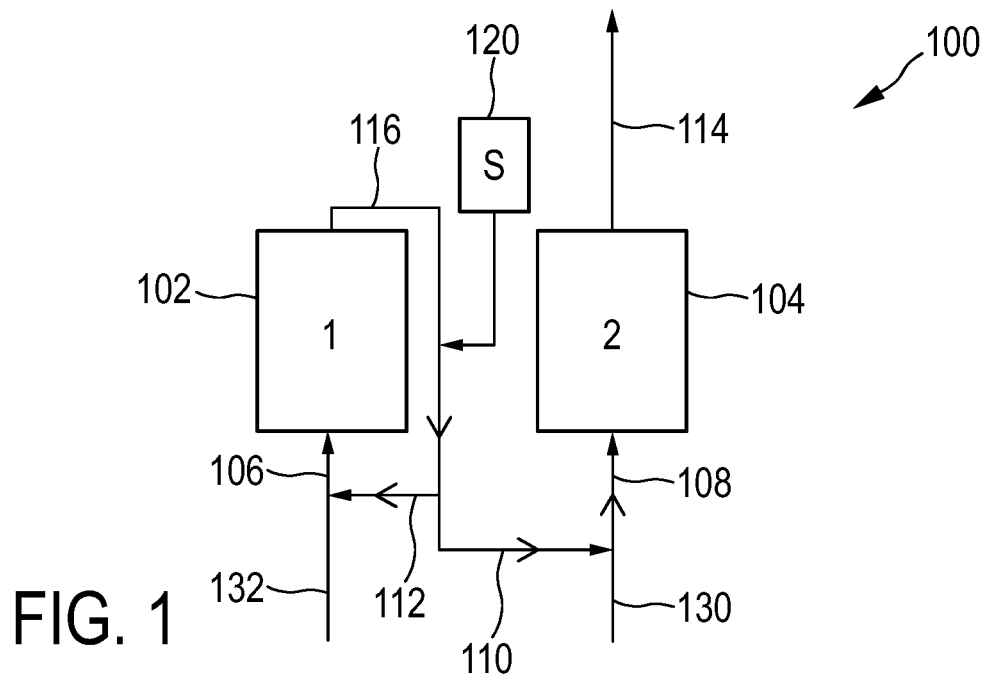
FIG. 1 shows a simplified block diagram of a first embodiment of a cryptography device in a first operating condition.

FIG. 1 is a simplified view of a cryptography device 100 in a first operating condition. The cryptography device 100 includes a first computing block 102 with a first data input 106 and a first data output 116 and a control unit 120 which assigns first output data 116 from the first data output 116 to the first data input 106 as first input data 112 so that the first data output 116 is coupled back to the first data input 106. That is illustrated by an arrow at the control unit 120. That data path is also referred to as the feedback data path. Data and the respective in/outputs are identified by the same references. The cryptography device 100 thus operates in the first operating condition already mentioned hereinbefore. The first computing block 102 and the second computing block 104 are also referred to hereinafter respectively as encryption and decryption blocks.

In addition the control unit 120 partially or completely assigns first output data 116 to a second data input 108 of a second computing block 104 as second input data 110. In that way partially first output data 110 and partially useful data 130 occur at the second data input 108. The first output data 110 fed to the second data input 108 are also referred to as additional data hereinafter for the sake of brevity. "Partially" can here signify either proportionate in parallel relationship or proportionate in serial relationship. In one case therefore in regard to one part useful data 130 and in regard to the other part additional data 110 occur in parallel relationship, while in the other case useful data 130 occur for a given number of system clocks and additional data 110 occur for a given number of subsequent or preceding system clocks.

The actual task of the cryptography device 100 is to process the useful data 130 and 132, that is to say to encrypt or decrypt same and to output encrypted or decrypted useful data to the exterior. The first output data 116 are not outputted to the exterior.

Useful data 130 and 132 can be data which have been transmitted from the outside to the cryptography device 100. The computing blocks 102 and 104 are encryption and decryption blocks. That means that they can encrypt or decrypt input data 106 and 108 and can output them at their data outputs 116 and 114.

The succession of the computing operations in the second computing block 104 or a number of computing operations to be carried out in parallel relationship in the second computing block 104 can be controlled by the additional data in a preferred embodiment. Such an embodiment is described in greater detail hereinafter with reference to FIG. 4. In such a case the second computing block 104 can also encrypt or decrypt exclusively useful data. In this case therefore the useful data perform solely the function of control information.

In the present embodiment the additional data 110 however can also have solely the function of reducing the side channel information which can be obtained from the cryptography device 100 by the additional encryption or decryption of the additional data in the second computing block 104. In such a particularly simple embodiment therefore the computing blocks 102 and 104 can also be formed without functional blocks for evaluation and conversion of the corresponding control information.

Figure 2:
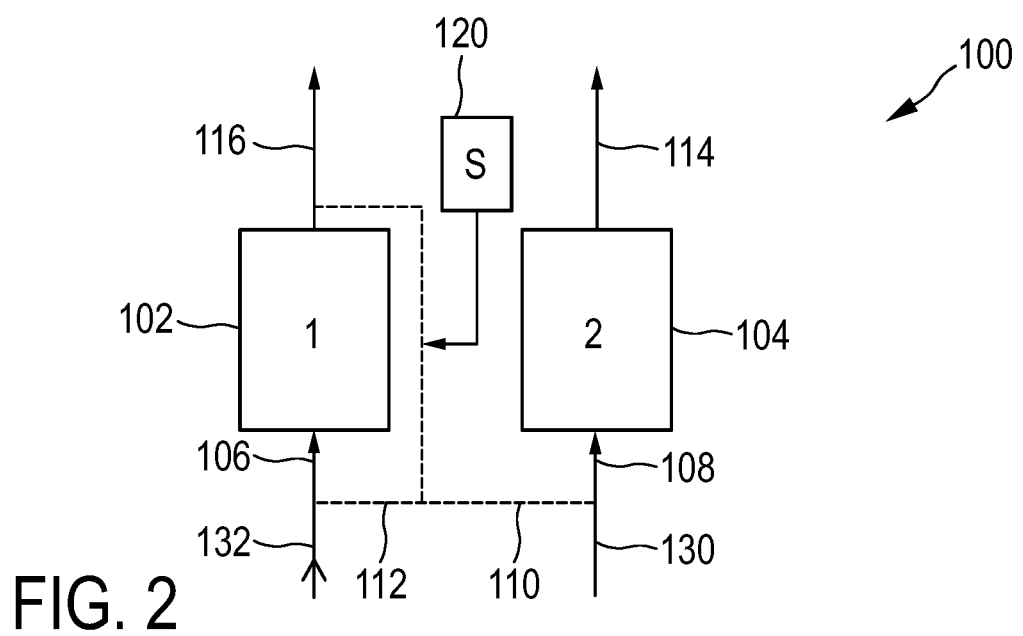
FIG. 2 shows the cryptography system of FIG. 1 in a second operating condition in which a control unit separates a data path.

FIG. 2 shows an embodiment of the cryptography device 100 of FIG. 1 in a second operating condition. This however does not mean that the respective parts are necessarily identical to those of FIG. 1 in terms of their function and structure.

In the FIG. 2 embodiment the control unit 120 interrupts the feedback data path 116 towards 112. That means that the data path 116 is also interrupted towards 110 to the second data input 108. The computing blocks 102 and 104 only process useful data 132 and 130 in parallel relationship as no additional data 112 and 110 are assigned to the data inputs 106 and 108. The useful data are outputted to the exterior at the first data output 116 and the second data output 114. That can take place by way of a device output (not shown).

Figure 3:
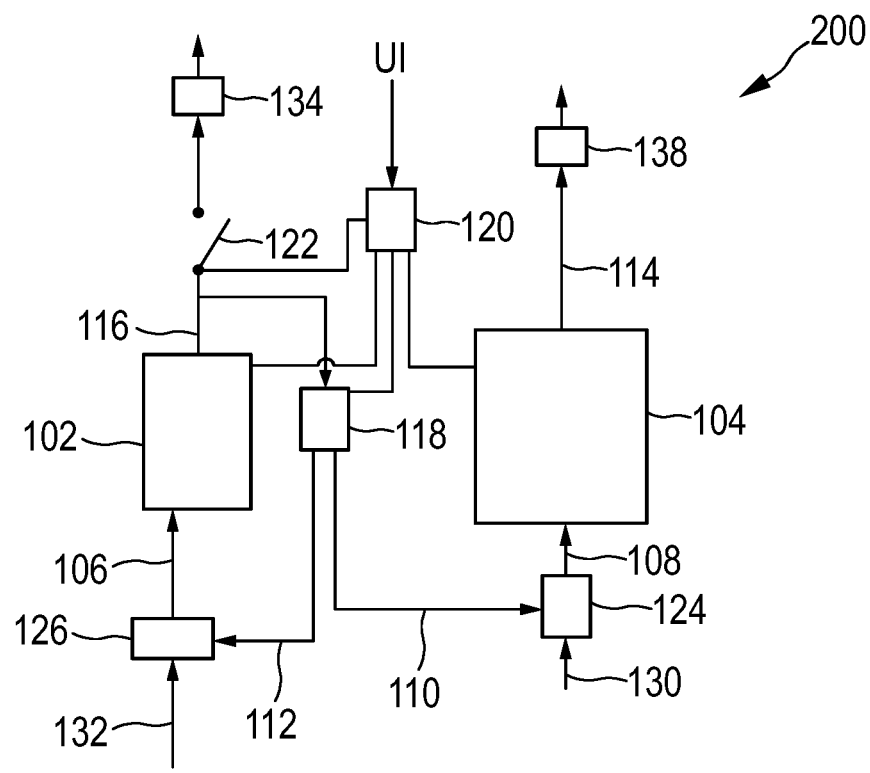
FIG. 3 shows a diagrammatic view of a second embodiment of the cryptography device.

FIG. 3 diagrammatically shows a further embodiment of a cryptography device 200 also referred to as a cryptography system 200, according to the invention. Here the functional elements corresponding to the cryptography device 100 of FIG. 1 are denoted by the same references as in FIG. 1, for the sake of simplicity. That however does not mean that the respective functional elements are necessarily identical to those of FIG. 1 in respect of their function and structure. The cryptography device 200 includes a first computing block 102 with a first input 106 for first input data 106 and a first data output 116 for output data 116. The cryptography system 200 is adapted to encrypt or decrypt first input data 106 and output same at the data output 116. In addition the cryptography device 200 includes a second computing block 104 with a second data input 108 and a second data output 114. The computing block 104 is adapted to encrypt or decrypt input data 108 and output same at the second data output 114. The computing blocks 102 and 104 are also referred to hereinafter as encryption and decryption blocks. In an embodiment input data and output data can also be data streams. For the sake of simplicity the same reference is used for inputs and outputs and the corresponding input data and output data which can be respectively taken off there.

The cryptography system 200 is adapted to operate like the cryptography device 100 in the first and second operating conditions as described hereinbefore.

In the first operating condition the first encryption and decryption block 102 is connected to the second data input 108 of the second encryption and decryption block 104 by way of a data switch 118.

The cryptography system 200 further includes a control unit 120. The control unit is connected to the first and second computing blocks 102 and 104 respectively, a switch 122 and the data switch 118. The control unit 120 is adapted to control the first computing block 102 and the second computing block 104 and to make information such as for example status information available or to query information.

In the first operating mode the control unit 120 opens the switch 122 so that no output data 116 are outputted at a first device output 134.

The first computing block 102 has a first data input 106 and a first data output 116 connected by way of the data switch 118 to the first data input 106. In the first operating condition the control unit 120 regulates the data switch 118 so that at least a part of the data stream 112 at the data output 116 is fed back to the first data input 106. In addition the control unit 120 controls the data switch 118 so that a part of the first output data 110 is transferred to the second data input 108 of the second computing block 104. The first output data 110 transmitted to the second computing block 104 form additional data as described hereinbefore and in the present context also the dummy data also referred to above.

In the first operating mode the second computing block 104 processes on the one hand the additional data 110 produced by the first computing block 102 and on the other hand useful data 130, in each case in proportionate relationship. In this embodiment the data are at the second data input 108. The second computing block 104 can also process only useful data 130 or only additional data 110.

In an embodiment the amount of additional input data 110 which the first computing block 102 transmits to the second computing block 104 is adjustable by way of the control unit 120 and the data switch 118. The additional input data 110 which are computed are not useful data 130. They serve only to camouflage the calculations of the second computing block 104. Those additional calculations serve to reduce side channel information according to the invention. In the case of particularly security-relevant calculations the quantity of the additional data 110 can be for example 90% and only 10% of the data are useful data 130 with which the encryption or decryption operation respectively is to be carried out. The additional input data 110 produced by the first computing block 102 by feedback are pseudo-random data. That can occur in such a way that a data sequence is delivered to the first data input 106 of the first computing block 102, which are encrypted there and are fed back again to the input 106, in which case at least a part of the first output data 110 is passed to the second computing block 104. At least a part of the fed-back data 112 passes a further time through the first computing block 102, is encrypted once again and is fed back again and at least partially transmitted to the second computing block 104.

In an embodiment the succession of the computing operations in the second computing block 104 is controlled by the useful data 110. The number of computing operations to be performed in parallel relationship can also be controlled by the additional data at the second data input 108.

In a further variant the first computing block 102 can include a second input (not shown) for fed-back data 112. In that case the first computing block 102 receives an input data stream 106 and a fed-back data stream 112, in which case it processes input data 106 and data 112 which are fed back, in a certain division ratio. At least parts of the data of the feedback line 112 are passed to the second computing block 104 as additional input data 110. That provides for a high degree of randomness in respect of the data 110 transmitted to the second computing block 104. Alternative that division ratio in respect of fed-back data 112 and input data 132 can be adjusted by a buffer 126.

In a further embodiment disposed upstream of the data inputs 106 and 108 are buffers 126 and 124 to provide for intermediate storage of data occurring at the input of the buffers 126 and 124 and to pass them to the computing blocks 102 and 104 in accordance with the capacity thereof. In this embodiment the buffer 124 has two inputs, one for the useful data 130 and one for the additional data 110. The buffer 124 can mix the useful data 130 and the additional data 110 in serial or parallel relationship in respect of time as described. The buffers 126 and 124 can be connected to the control unit 120 and the input data streams 106 and 108 can be controlled by the control unit 120. In an embodiment the buffers 126 and 124 can be queried by the computing blocks 102 and 104. For that purpose, when computing capacity becomes free, a computing block 102, 104 can call up data from the respective buffer 126, 124. That can be effected by predefined data packets being called up with a clock or an address line can be provided, connecting the buffer 126, 124 and the respective computing block 102, 104 in order directly to address data and call same up out of the buffer 126, 124. An address line or a clock line can also connect the control unit 120 and the buffers 126 and 124. Control of the buffers 126 and 124 can also be predetermined by an external system clock. The buffers 126 and 124 can also control the proportions of additional data 110 or 112 and the proportions of the useful data 132 and 130, in which case the control unit 120 can predetermine the respective proportions when it is connected to the buffers 126 and 124.

In an embodiment the cryptography device 200 includes a random source (not shown) which is not manipulatable, such as for example the noise of a resistor, which is converted into a digital signal. A number outputted as a digital signal can be used for initialization of the first computing block 102 in the first operating condition. An alternative is to generate a random number and to store same in the first use thereof in a non-volatile memory. The memory can be included in the buffer 126. In the further course of operation the random number is then used as an initialization vector. After conclusion of the computations the result is stored in the same memory, that is to say the previous random vector is replaced by up-to-date output data. In this embodiment that memory is no longer manipulatable from the exterior after the first initialization.

In the present embodiment the control unit 120 is connected to a user interference UI or to another control device. That makes it possible for the operating condition and other settings such as the proportions of useful data 130 and the proportions of the additional data 110 and so forth to be predetermined from the exterior.

In the second operating condition the control unit 120 closes the switch 122. At the same time it blocks the data switch 118 at both outputs 112 and 110. In that way no more data are fed back from the data output 116 of the first computing block 102 to the first data input 106. In this operating condition, no additional input data 110 are also transmitted to the second data input 108 of the second computing block 104 because the data switch 118 is in the blocked condition. Accordingly the two computing blocks 102 and 104 can encrypt or decrypt input data or data streams 130 and 132 independently of each other and in parallel relationship. The output data 116 and 114 of the first and second computing blocks 102 and 104 are outputted at a respective device output 134, 136.

In a variant the first computing block 102 is an AES encryption and decryption block (Advanced Encryption Standard) and the second computing block 104 is an ECC computing block (Elliptic Curve Cryptosystem).

Figure 4:
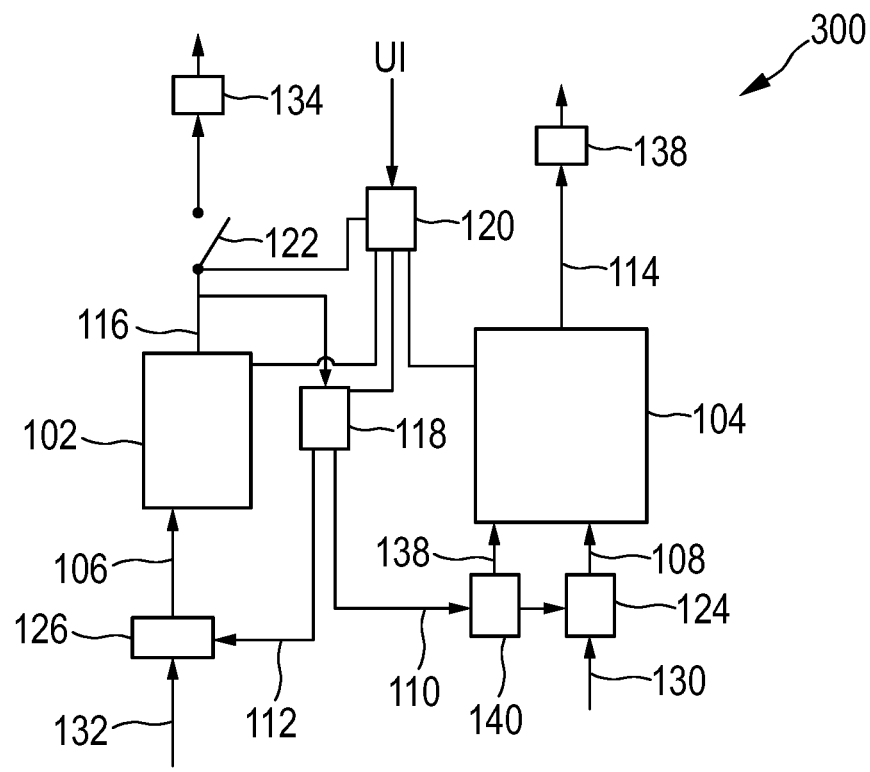
FIG. 4 shows a diagrammatic view of a third embodiment of the cryptography device, FIG. 5, for describing in greater detail the mode of operation of the cryptography devices of FIGS. 1 through 4, diagrammatically shows parallel multiplication units as can be used in the second computing block in a first fashion, FIG. 6, for describing in greater detail the mode of operation of the cryptography devices of FIGS. 1 through 4, diagrammatically shows parallel multiplication units as can be used in the second computing block in a second fashion.
Figure 5:
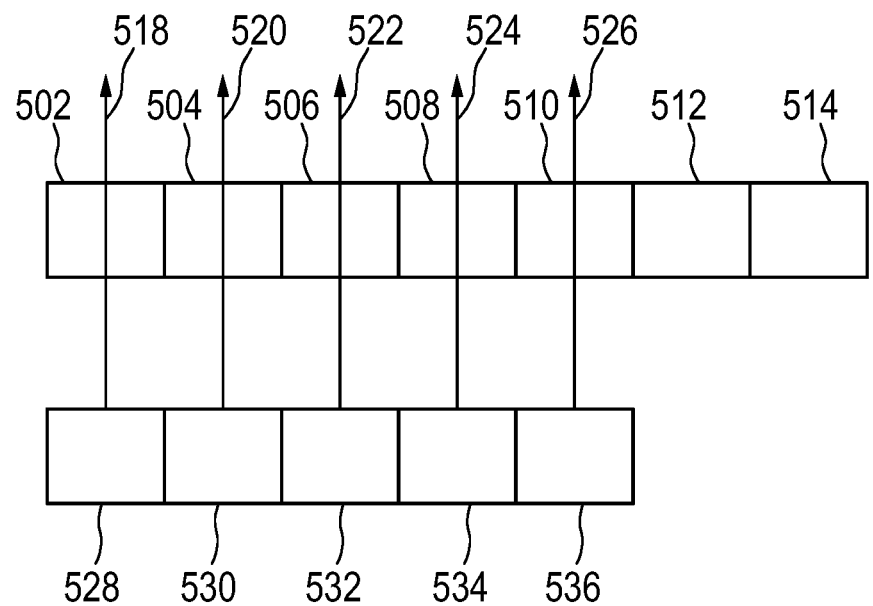

FIG. 4 shows a further variant of a cryptography device 300. The cryptography device 300 is substantially identical to the variant of FIG. 3 with the distinction that the second computing block 104 has an additional data input 138 and the data switch 118 is not connected directly to the buffer 124 but to a second data switch 140. The second data switch 140 is connected to the control unit 120 and is controllable thereby (not shown).

In the first operating condition the additional data 110 are assigned at least in respect of a proportion thereof to the second computing block 104 by the data switch 140. In that respect the control unit 120 is adapted to control the data switch 140 so that at least a proportion of the additional data 110 can be fed to the buffer 124 to be combined with the useful data 130 and at least a proportion of the useful data 110 can be fed to the additional data input 138. The additional data input 138 can also be referred to as sequence control input 138. The additional data 110 can be referred at the sequence control input 138 as succession control information or as succession control information flow. In this embodiment the second computing block 104 is adapted to extract succession control information contained in a control signal received from the control unit 120 and to adjust the succession of computing operations to be performed in dependence on the extracted succession control information. For that purpose the second computing block 104 can include an operation control block (not shown). More specifically the succession of the computing operations in the second computing block 104 is controlled by way of the succession control information flow at the sequence control input 138.

The control unit 120, by means of the additional data 110, can also predetermine the number of computing operations to be carried out in parallel relationship, per clock unit, for example by a control signal. In this embodiment the first computing block 102 or the second computing block 104 or both computing blocks 102 and 104 are preferably adapted to extract control information from the incoming stream of additional data 110 and/or 112 and to adjust the number of computing operations to be carried out in parallel relationship in the respective computing block 102, 104 per clock unit in dependence on the extracted control information. The additional data 110 and 112 form or include control signals in that respect.

In an embodiment the control unit 120 can change between various operating settings. In a first operating setting the second computing block 104 processes the additional data 110 and the useful data 130. In that case the additional data 110 and the useful data 130 are mixed in the buffer 124. In other words, of a part of data processed in parallel relationship by the second computing block 104 a first proportion comprises useful data 130 and a second proportion comprises additional data 110. The control unit 120 controls the second data switch 140 so that the additional data 110 are passed through to the buffer 124.

In a second operating setting the second computing block 104 sequentially processes useful data 130 and after some system clock cycles additional data 110. In that respect the buffer 124 is adapted to sequentially and repeatedly pass useful data 130 and thereafter additional data 110 to the second data input 108. In that case the data at the second data input 108 can be in the form of data blocks. Those data blocks can be for example 256 bits in length.

In those operating settings the second data switch 140 does not pass any additional data 110 or any control flow to the sequence control input 138.

In a third operating setting the second computing block 104 processes exclusively useful data 130 or useful data 130 and additional data 110. In that case the second computing block 104 controls the succession of the computing operations to be carried out upon encryption or decryption on the basis of the additional data 110 at the additional data input 138.

In a fourth operating setting the second computing block 104 processes exclusively useful data 130 or useful data 130 and additional data 110. In that case the second computing block 104 controls the number of computing operations to be carried out in parallel relationship on the basis of the additional data 110 or the control flow. The proportions of the useful data 130 and the additional data 110 which are delivered to the second data input 108 can in that case be controlled by the buffer 124. In those operating settings the control unit 120 controls the second data switch 140 so that additional data 110 are passed at least in respect of a proportion thereof both to the sequence control input 138 and also to the buffer 124 and thus to the second data input 108. The control unit 120 can also predetermine for the second data switch 140 to pass additional data 110 exclusively to the sequence control input 138.

The operating settings can be adjusted during the second operating condition by the control unit 120.

For describing in greater detail the mode of operation of the cryptography devices 100, 200, 300 in FIGS. 1 through 4 FIG. 5 diagrammatically shows parallel multiplication units 502 through 514 as can be used in the second computing block in a first fashion.

At least one of the two computing blocks 102, 104 includes a plurality of multiplication units 502 through 514, also referred to as multipliers, which can perform multiplication operations, diagrammatically illustrated by arrows 518 through 526, in parallel relationship. In that case, during each multiple multiplication step which includes a plurality of parallel multiplication operations 518 through 526 at a plurality of data units 528 through 536 which are available in parallel relationship, a different number of multiplication operations can be performed in parallel relationship. That can be a random number of parallel multiplication operations as in the present case, the five multiplication operations 518 through 526. The remaining multiplication units 512 through 514 do not perform any multiplication operation.

The data units 528 through 536 can be bit blocks of any length such as for example 4-bit blocks. That different number of multiplication operations 518 through 526 which are performed in parallel provides that the proportion of side channel information is reduced because for example the duration and the power consumption for a multiplication operation is different. The number of parallel multiplication operations 518 through 526 used can be controlled on the basis of the additional data 110, 112.

Figure 6:
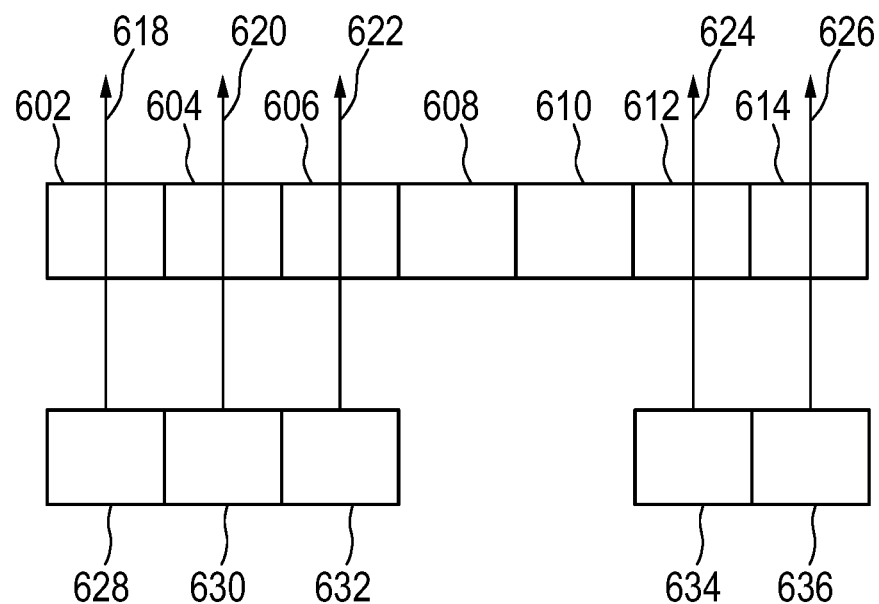

Reference is made hereinafter to FIG. 6. To describe in greater detail the mode of operation of the cryptography devices 100, 200, 300 in FIGS. 1 through 4, FIG. 6 diagrammatically shows parallel multiplication units 602 through 614 as can be used in the second computing block 104 in a second fashion. As shown in FIG. 6 a random number of multiplication units 602 through 606 can also compute random data 628 through 632 or dummy data 628 through 632 while the other multiplication units 612, 614 process the input data of the computing blocks 634, 636 and some multiplication units 608, 610 do not perform any computing operations. In that way the side channel information can be additionally reduced because random noise can be generated by still smaller data blocks. In addition the power consumption can be more accurately adjusted because multiplication operations which are not performed in the multiplication units 608, 610 consume less power. In that respect the control unit 120 can predetermine the operations which are carried out in parallel and proportions of useful data 634, 636 and additional data 628 through 632. For that purpose the control unit 120 is connected to the computing blocks 102, 104, the buffer 124 and the second data switch 140.

In an embodiment multiplication operations are carried out by means of a Karatsuba multiplication. Other multiplication operations can be carried out with other implementations of multiplication.

In an embodiment the operation flow can be variable. In that way the sequence of operations within an encryption or decryption algorithm is interchanged in accordance with a control flow insofar as the algorithm permits. Preferably the sequence is influenced randomly. By virtue of a random sequence of the operations, less is known to an observer or attacker about the processes in the cryptosystem whereby side channel information can be more poorly assigned. In this embodiment no additional power or time is consumed for the algorithm because the total number of operations remains the same.

In an embodiment the control unit 120 controls the selection of the sequence of computing operations or the number of multiplication operations implemented in parallel. Therefore it can be connected to the computing blocks 102 and 104 by way of control lines.

The additional data 110 and possibly the random control flow can be delivered by the first computing block 102 in the form of dummy data. In a variant the control unit 120 can receive the fed-back output data 116 and use them for control of the variable operation flow for the computing operations in the second computing block 104. That part of the control unit 120 can also be partially or completely integrated into the second computing block 104.

In an embodiment at least one of the computing blocks 102 or 104 includes precisely 81 4-bit multiplier units which can be addressed in parallel.

In an embodiment the computing block which includes a plurality of parallel multiplication units is the second computing block 104.

The control unit 120 can also comprise a plurality of parts and can be entirely or partially integrated in the computing blocks 102 and 104.

Variants are also possible, in which both computing blocks 102 and 104 can respectively perform the part of the first computing block 102 or the second computing block 104. In that respect the control unit 120 is adapted to control the computing blocks 102 and 104 in such a way that they operate either as a first feedback computing block 102 for generation of additional data 112, 110 or as a second computing block 104 for at least partial processing of useful data 130.

The additional data 112 and 110 can hereinafter also be identified as additional (pseudo-random) control signals, pseudodata, random data or random stream.

Figure 7:
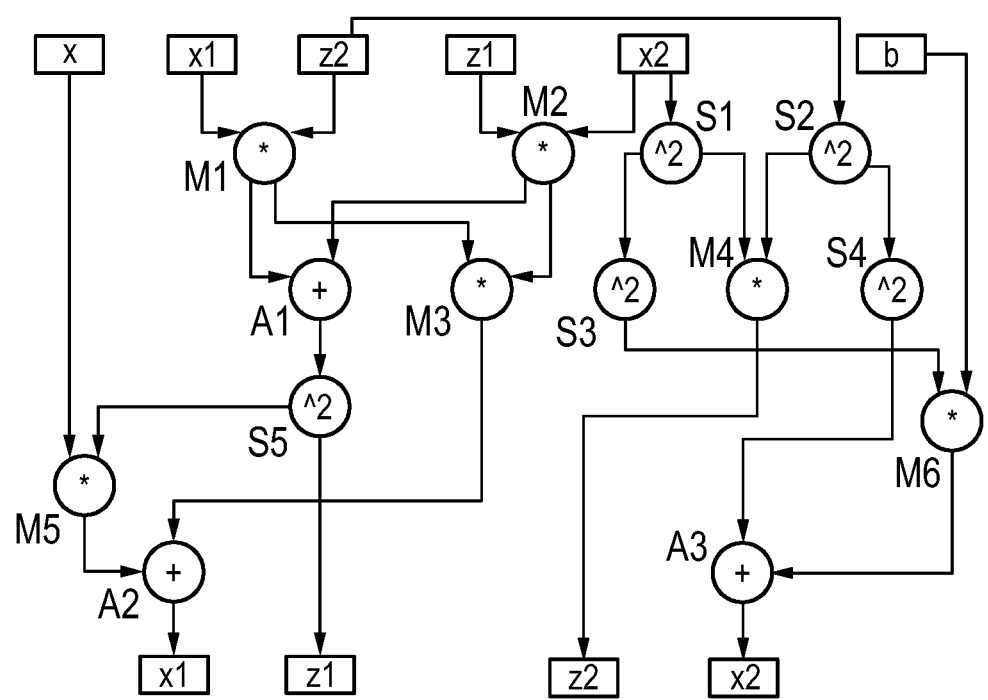
FIG. 7 shows a flow chart for an iteration operation in encryption and decryption in accordance with an elliptic curve cryptography (ECC) algorithm.

FIG. 7 shows a flow chart for an iteration operation in encryption/decryption in accordance with an elliptic curve cryptography (ECC) algorithm. Numbers are denoted with x through x2 and z through z2 and multiplication operations with M1 through M6. Exponent operations are denoted by S1 through S5 and addition operations by A1 through A3.

That procedure has to be implemented for each bit of the key. That flow chart applies for the situation where the current bit is 1. If it is 0 the flow chart looks different. It is the inner loop of the Montgomery or Lopez/Dahab algorithm. Further details are described in: Julio Lopez and Ricardo Dahab: "Fast multiplication on elliptic curves over gf(2m) without precomputation", in CHES '99: Proceedings of the First International Workshop on Cryptographic Hardware and Embedded Systems, pages 316-327, London, UK, 1999. Springer-Verlag.

The dependencies of the operations can be seen on the graph. For example A1 is dependent on the multiplications M1 and M2. Either M1, M2, 51 or S2 can be performed as the first operation. There is obviously a quantity of possible specific procedures. In this embodiment the specific procedure is made dependent on the additional (pseudo-random) control signals. Management and execution occurs in that case in the ECC block forming the second computing block 104. There is a control block which controls the flow, in the second computing block 104. That control block can also be part of the control unit 120. It processes the control signals from the control unit 120 and the additional data 110. In that case the control unit 120 predetermines the operating condition and possibly the operating setting, and the first computing block 104 delivers the additional or random data 110. In the third operating settings the control unit 120 controls the succession of the computing operations in the second computing block 104 on the basis of the random data stream 110. If the random data stream 110 delivers for example a "0", M1 is performed as the first operation. If a "1" is delivered it is M2. If a "2" or "3" comes it is S1 or S2 respectively.

What is claimed is:

1. A cryptography device including
   a first computing block adapted to either encrypt or decrypt received first input data containing useful data and to output the encrypted or decrypted first input data as first output data at a first data output,
   a second computing block adapted to either encrypt or decrypt received second input data and to output the encrypted or decrypted second input data as second output data at a second data output, and
   a control unit connected to the first and second computing blocks and adapted
   in a first operating condition to partially or completely assign the first output data to the first computing block as part of the first input data and to completely or partially assign the first output data to the second computing block as part of the second input data.

2. The cryptography device as set forth in claim 1 in which the first or the second computing block is adapted to compute the received first or second input data in accordance with a symmetrical encryption or decryption method.

3. The cryptography device as set forth in claim 1 in which the first or the second computing block is adapted to compute the received first or second input data in accordance with an asymmetrical encryption or decryption method.

4. The cryptography device as set forth in claim 1 wherein, in the first operating condition, the control unit is adapted to assign to at least one of the computing blocks useful data and dummy data as respective first input data and second input data.

5. The cryptography device as set forth in claim 4 wherein the dummy data are formed by a part of the first output data or by the first output data.

6. The cryptography device as set forth in claim 1 in which the control unit is adapted to switch off and on operation of the first or second computing block independently of each other.

7. The cryptography device as set forth in claim 1 in which the second computing block is adapted to perform multiplications of the input data using a Karatsuba method.

8. The cryptography device as set forth in claim 1 wherein at least one of the first or second computing block has a plurality of parallel multiplication units.

9. The cryptography device as set forth in claim 1 in which the control unit is adapted to predetermine for the first or second computing block a number of computing operations which are to be carried out in parallel relationship per clock unit in each case either from one clock unit to another clock unit or at greater time intervals.

10. The cryptography device as set forth in claim 1 in which the first computing block may is connected to a first device input for first useful data and a device output and the second computing block is connected to a second device input for second useful data and the device output, and in which the control unit is configured to change a state of operation of the cryptography device from the first operating condition to a second operating condition, and the control unit is adapted in the second operating condition to pass the first output data to the device output and not to the second computing block or to the first computing block and also pass the second output data outputted by the second computing block to the device output.

11. The cryptography device as set forth in claim 10 in which the control unit is adapted to change between the first and the second operating conditions.

12. The cryptography device as set forth in claim 1 in which the control unit is adapted to predetermine for the first or second computing block one of a multiplicity of predetermined successions of computing operations.

13. The cryptography device as set forth in claim 1 in which the control unit is adapted to predetermine a succession of the computing operations in the second computing block.

14. The cryptography device as set forth in claim 1 wherein the first or the second computing block comprises a multiplicity of multiplication units and the control unit is adapted to pass in parallel useful data to a first subset of the multiplication units and at least a part of the first output data to a second subset of the multiplication units.

15. The cryptography device as set forth in claim 1 wherein the first and second computing blocks and the control unit are respectively hardware-implemented.

16. The cryptography device as set forth in claim 1 which is in the form of a smart card.

17. An integrated circuit which comprises a cryptography device as set forth in claim 1.

18. A method of encrypting or decrypting data, wherein the method comprises:
   encrypting or decrypting first input data containing useful data with a first computing block and outputting the encrypted or decrypted first input data as first output data at a first data output,
   encrypting or decrypting second input data with a second computing block and outputting the encrypted or decrypted second input data as second output data at a second data output, and
   assigning the first output data either partially or completely as part of the first input data to the first computing block and assigning same either partially or completely as part of the second input data to the second computing block.

19. A computer program product including executable program code on a non-transitory machine-readable media, wherein the program code is adapted to carry out the method as set forth in claim 18 upon execution on a computer.

\* \* \* \* \*